United States Patent
Hayashi et al.

[11] Patent Number: 6,069,724
[45] Date of Patent: May 30, 2000

[54] OPTICAL SCANNING LENS AND OPTICAL SCANNING APPARATUS

[75] Inventors: Yoshinori Hayashi, Kawasaki; Seizo Suzuki, Yokohama; Koji Masuda, Tokyo-to, all of Japan

[73] Assignee: Ricoh Company, Ltd., Japan

[21] Appl. No.: 09/021,595

[22] Filed: Feb. 10, 1998

[30] Foreign Application Priority Data

Feb. 17, 1997 [JP] Japan .................................. 9-032326

[51] Int. Cl.$^7$ .................................................. G02B 26/08
[52] U.S. Cl. ........................ 359/206; 359/205; 359/207; 359/215; 359/720
[58] Field of Search .................................. 359/205, 206, 359/207, 215, 662, 708, 718, 720

[56] References Cited

U.S. PATENT DOCUMENTS

| | | | |
|---|---|---|---|
| 5,710,654 | 1/1998 | Ota | 359/205 |
| 5,828,480 | 10/1998 | Nakamura et al. | 359/206 |
| 5,875,051 | 2/1999 | Suzuki et al. | 359/205 |

FOREIGN PATENT DOCUMENTS

| | | |
|---|---|---|
| 1155669 | 7/1997 | China . |
| 08076011 | 3/1996 | Japan . |
| 08190062 | 7/1996 | Japan . |
| 08248308 | 9/1996 | Japan . |
| 08297256 | 11/1996 | Japan . |
| 9-179017 | 7/1997 | Japan . |
| 9-179019 | 7/1997 | Japan . |

Primary Examiner—Cassandra Spyrou
Assistant Examiner—Darren E. Schuberg
Attorney, Agent, or Firm—Graham & James LLP

[57] ABSTRACT

An optical scanning apparatus includes an optical scanning lens composed of a single lens which is arranged and adapted to correct for placement errors of optical elements. The shapes of both surfaces of the optical scanning lens are non-arc in a deflective surface and at least one surface thereof has a special toric surface. The scanning lens is meniscus having a concave shape in a sub-scanning direction and is biconvex in a main scanning direction.

18 Claims, 7 Drawing Sheets

$\left|\dfrac{S}{W}\right| > 3$ $\left|\dfrac{S}{W}\right| < 3$

45°

-2.00  2.00
CURVATURE OF FIELD (MM)

45°

-2.00  2.00
DISTORTIVE ABERRATION (%)

45°

-2.00  2.00
CURVATURE OF FIELD (MM)

45°

-2.00  2.00
DISTORTIVE ABERRATION (%)

CURVATURE OF FIELD (%)

DISTORTIVE ABERRATION (%)

CURVATURE OF FIELD (MM)

DISTORTIVE ABERRATION (%)

CURVATURE OF FIELD (MM)

DISTORTIVE ABERRATION (%)

CURVATURE OF FIELD (MM)

DISTORTIVE ABERRATION (%)

OPTICAL SCANNING LENS AND OPTICAL SCANNING APPARATUS

BACKGROUND OF THE INVENTION

1. Field of the Invention

The present invention relates to an optical scanning lens and an optical scanning apparatus, and more particularly to an optical scanning lens having an improved single-lens construction.

2. Description of Related Art

A conventional optical scanning apparatus includes an optical deflector which deflects at equiangular velocity a light flux that has been formed into a line image, which extends in a direction corresponding to a main scanning direction. The optical deflector has a deflective reflecting surface which is located in the vicinity of a position where the line image is formed. The deflective reflective surface condenses the light flux into a light spot on a surface to be scanned by an optical scanning lens so as to optically scan the surface to be scanned at a constant velocity.

This type of optical scanning apparatus has been widely used in optical printers and digital copying equipment. The phrase "the direction corresponding to the main scanning direction" used herein means the direction which corresponds to the main scanning direction on an optical path from a light source to a surface to be scanned, and the phrase "the direction corresponding to the sub-scanning direction" means the direction which corresponds to the sub-scanning direction on the above-described optical path.

The use of an optical scanning lens device having a single-lens construction has been proposed for such an optical scanning apparatus, for example, in Japanese Unexamined Patent Publication No. 7-174998. The purpose of using a single-lens construction is to achieve a compact size and lower assembly cost for the optical scanning apparatus.

It is desired that an optical scanning apparatus is sufficiently compact while also having an extensive effective main scanning width. For this reason, it is necessary to position an optical scanning lens as close to an optical deflector as possible in order to maximize the range of the effective deflection angle of an optical deflector while minimizing the overall size of the optical scanning lens and optical scanning apparatus.

In the device disclosed in Japanese Unexamined Patent Publication No. 8-248308 and No. 8-190062, however, as the optical scanning lens is positioned closer to the optical deflector, the image forming magnification of the optical scanning lens in the direction corresponding to the sub-scanning direction unavoidably increases. As a result, even the slightest displacement in the location where the line image is formed along the optical path caused by a slight positional error of the optical system components arranged for forming the line image in the direction of the optical axis causes a significantly displaced position of formation of a light spot resulting from the line image in the direction corresponding to the sub-scanning direction. This large position displacement of the light spot occurs because the longitudinal magnification increases with the square of the lateral magnification. Thus, the curvature of field in the sub-scanning direction would be significantly deteriorated and substantially less than the desired curvature of the original design.

Conversely, if an excessive emphasis is placed on reducing the image forming magnitude in the direction corresponding to the sub-scanning direction of the optical scanning lens as in the case of the device described in Japanese Unexamined Patent Publication No. 8-76011 or No. 8-297256, then the wave front aberration around the image formation point in the vicinity of a surface to be scanned would increase. As a result, it would be difficult to decrease the diameter of the light spot or the light spot would significantly increase in size if a cylinder lens or an optical scanning lens for forming the line image is inclined with respect to the optical axis.

In other words, according to the conventional devices described above, the cylinder lens and the optical scanning lens must be arranged and mounted with extremely high accuracy in order to obtain the desired effect since a slight optical dislocation leads to a serious deterioration in optical scanning performance.

Obviously, it is desirable that the optical scanning apparatus having only a single lens exhibits desired constant scanning velocity characteristics during the optical scanning process and ensures successful correction of curvature of field in both the main scanning direction and the sub-scanning direction so as to prevent the diameter of the light spot from being varied according to the image height of the light spot.

To achieve successful correction of the changes in the light spot diameter, it is not sufficient to only correct the curvature of field. In the device described, for example, in Japanese Unexamined Patent Publication No. 4-50908, although the curvature of field of the optical scanning lens in the sub-scanning direction may be corrected, the image forming magnification of the optical scanning lens in the direction corresponding to the sub-scanning direction varies according to deflection angle. As a result, the diameter of the light spot in the sub-scanning direction changes significantly according to the image height of the light spot.

Further, if a general polygon mirror is used as the optical deflector, then "sag" which is a spatial mismatch between the position where a foregoing line image is formed and a current line image is formed, may occur. The "sag" condition results from the deflective reflecting surface being arranged asymmetrically in relation to a zero deflection angle according to the deflection angle of a deflected light flux because the rotation axis of the polygon mirror is spaced at different distances from the deflective reflecting surfaces of the polygon mirror. This causes a problem in which the performance of the optical scanning lens deteriorates.

Thus, a single-lens construction of an optical scanning lens must satisfy many diverse conditions as described above. Therefore, when constructing the single-lens system, it is necessary to form at least one surface thereof into a special non-spherical surface. For this reason, fabrication using a plastic material is suited for making the optical scanning lens composed of a single lens. However, if the optical lens composed of the single lens is made as a biconvex lens, then the thickness tends to increase in a paraxial portion and the difference in thickness between the paraxial portion and a peripheral portion is consequently increased. As a result, when fabricating the optical scanning lens via a plastic molding process, known shaping errors such as a "sink mark" and "swelling" frequently occur during the molding process.

The above-described shaping errors cause serious deterioration in actual performance of the scanning lens and optical scanning apparatus no matter how good the design performance may be. This problem is especially significant when an optical scanning lens is disposed in the vicinity of an optical deflector to prevent an increase of the size of a scanning image forming lens in an effort to provide the scanning image forming lens with a wider angle while reducing the size of the optical scanning apparatus incorporating the lens and expanding the optical scanning range thereof.

When using the single-lens construction for the optical scanning lens, shaping the lens surface that is located closest to the optical deflector into a convex surface is effective for improving the constant velocity function represented by the fθ function. It should be noted, however, that when shaping the lens surface on the side closest to the optical deflector into the convex surface, the edge thickness of the lens decreases as the radius of curvature decreases and the difference in thickness between the paraxial portion and the peripheral portion also tends to increase, frequently leading to the problems described above. Furthermore, as the radius of the curvature of the lens surface on the side located closest to the optical deflector decreases, the incident angle of a deflected light flux relative to the lens surface, i.e. the angle formed by the outward normal line of the lens surface and the main beam of the incident deflected light flux, increases toward the periphery of the lens in the direction corresponding to the main scanning direction. This frequently causes a deteriorated curvature of field or non-constant velocity characteristics resulting from the shaping error of the lens surface.

SUMMARY OF THE INVENTION

To overcome the problems described above, the preferred embodiments of the present invention provide an optical scanning lens and optical scanning apparatus in which a single-lens construction achieves a significantly improved curvature of field in the main and sub-scanning directions and constant scanning velocity characteristics so as to produce a light spot which has a substantially reduced and uniform diameter that is not affected by a placement error in the direction of an optical axis in optical positioning, an inclination relative to the optical axis, or other problems caused by changes in image height and by "sag," "sink marks" or "swelling" of the lens.

Furthermore, the preferred embodiments of the present invention provide a single-lens construction for a scanning lens and apparatus which is adapted and arranged to minimize the occurrence of shaping errors when fabricating the single lens of a suitable material such as plastic and to ease the restrictions on the assembly and positioning tolerances of optical elements in the direction of an optical axis.

The preferred embodiments of the present invention also provide an optical scanning lens and apparatus having a single-lens construction which achieves a reduced size, higher optical performance and higher yield of useable optical scanning lens.

According to a specific preferred embodiment of the present invention, there is provided a scanning lens in an optical scanning apparatus that includes a light source for generating a laser beam and a light deflector having a reflective surface for deflecting the laser beam such that the light flux resulting from the deflected light is formed into a line image which extends in a direction corresponding to a main scanning direction. The scanning lens focuses and condenses the light flux into a light spot on a scanning surface, which is a surface to be scanned, so as to optically scan the surface to be scanned at constant velocity.

The optical scanning lens according to preferred embodiments of the present invention has a single lens so as to achieve a compact design of the scanning lens and overall scanning apparatus. The shape of the single scanning lens in a deflective orthogonal surface in a sub-scanning direction is a meniscus that is concave on the side of the lens located closest to the deflective reflecting surface of the light deflector.

If it is assumed that a light flux is ideally deflected by the light deflector, a plane over which the principal ray of the light flux sweeps as the light flux is deflected is referred to as "deflective surface." In the design stage, an optical scanning lens is disposed so that the optical axis thereof matches that of the deflective surface of the light deflector. The description related to the optical scanning lens in this specification is based on a state wherein the optical scanning lens is ideally disposed relative to the deflective surface of the light deflector.

Among the planes orthogonal to the deflective surface, the plane that is parallel to the optical axis of the optical scanning lens, i.e. the one located within the deflective surface, is referred to as the "deflective orthogonal surface." The deflective orthogonal surface is preferably substantially parallel to the sub-scanning direction in a surface to be scanned.

According to the preferred embodiments of the present invention, both surfaces of the optical scanning lens preferably have non-arc shapes in the deflective surface in the main scanning direction, i.e. in the cross section at the deflective surface.

The non-arc shape can be specified, for example, by applying R, K, A, B, C, D and so on in formula (1A) shown below which is widely known as a "formula of a non-spherical surface":

$$X = Y^2 / \left[ R + R \cdot \sqrt{\{1 - (1+K)(Y/R)^2\}} \right] + \\ A \cdot Y^4 + B \cdot Y^6 + C \cdot Y^8 + D \cdot Y^{10} + \cdots \quad (1A)$$

where

X is the coordinate in the direction of optical axis;

Y is the coordinate in the direction orthogonal to optical axis;

R is the paraxial radius of curvature;

K is the cone constant;

A, B, C, D . . . are coefficients of higher degree.

The non-arc shape can be also expressed by other formula which are equivalent to formula (1A) above.

The curvature in the deflective orthogonal surface of at least one surface of the optical scanning lens varies according to the distance from the optical axis in the direction corresponding to the main scanning direction. A line which passes through the centers of the curvatures in the deflective orthogonal surface is not straight but instead is a curved line having varying directions of curves and varying degrees of curves. This achieves accurate correction of distortions in field of curvature and also provides a uniform beam spot diameter.

If the radius of curvature in the deflective orthogonal surface including the optical axis in the surface located closest to the side of the optical deflector is denoted as $r_{s1}(0)$, the radius of curvature in the deflective orthogonal surface including the optical axis in the surface on the side of the surface to be scanned is denoted as $r_{s2}(0)$, the effective main scanning width is denoted as W, and the distance on the optical axis from the starting point of deflection given by the optical deflector to the surface to be scanned is denoted as L, then $r_{s1}(0)$, $r_{s2}(0)$, W, and L satisfy the condition shown below:

$$0.2 \leq \{r_{s2}(0)/r_{s1}(0)\} \times (W/L)^2 \leq 0.6 \qquad (1)$$

Thus, in the optical scanning lens in accordance with the preferred embodiments of the present invention, both surfaces of the lens in the deflective surface are preferably non-arc in the main scanning direction. When the non-arc shapes of the optical scanning lens are properly formed, it is possible to successfully correct for distortions and achieve a constant scanning velocity characteristics including the fθ characteristic and also curvature of field in the main scanning direction.

Further, the curvature of field in the sub-scanning direction can be successfully corrected by properly changing the radius of curvature in the deflective orthogonal surface according to the distance from the optical axis in the main scanning direction at least in one surface of the scanning lens.

The shape within the deflective orthogonal surface is preferably a meniscus that is concave on the side of the deflective reflecting surface in the sub-scanning direction. The meniscus shape in combination with condition (1) make it possible to position both front and rear principal points of the image formation in the direction corresponding to the sub-scanning direction on the side of the surface to be scanned. This allows the magnification of image formation in the direction corresponding to the sub-scanning direction to be decreased even when the main body of the optical scanning lens is disposed closer to the optical deflector.

If the upper limit of condition (1) described above is exceeded, however, the wave front aberration around the image formation point, i.e. the point where the deflected light flux is condensed, in the vicinity of the surface to be scanned increases, making it difficult to reduce the diameter of the light spot. This results in a significantly large diameter of the light spot when a cylinder lens for forming a line image or the optical axis of the optical scanning lens is inclined with respect to the deflective surface.

Conversely, if the lower limit of condition (1) described above is exceeded, then both front and rear principal points of the optical scanning lens move closer to the optical deflector and the magnification of image formation of the optical scanning lens in the direction corresponding to the sub-scanning direction accordingly increases. As a result, a positional error of the cylinder lens in the direction of the optical axis causes significant displacement of the light spot image forming position, leading to considerably deteriorated curvature of field in the sub-scanning direction as compared with the desired curvature of field of the original design.

The radius of curvature within the deflective orthogonal surface in one of the surfaces of the optical scanning lens may be set to an approximately fixed value regardless of the distance from the optical axis in the direction corresponding to the main scanning direction. In this case, the curve passing through the centers of the curvatures within the deflective orthogonal surface in the lens surface is nearly identical to the foregoing non-arc which is the shape within the deflective surface of the lens surface.

Thus, when the radius of curvature within the deflected orthogonal surface of one surface of the scanning lens is set to the approximately fixed value, even if the optical scanning lens is undesirably displaced along the direction of the optical axis, the shape of that surface of the scanning lens in the direction corresponding to the main scanning direction simply moves parallel relative thereto, so that the influences on the constant velocity characteristics or the curvature of field in the main scanning direction are minimized. It is also possible to successfully correct the curvature of field in the sub-scanning direction by properly changing the radius of curvature within the deflective orthogonal surface of the other lens surface in the direction corresponding to the main scanning direction such that two surfaces of the scanning lens have the radius of curvature which has been determined to correct the curvature of field.

According to another aspect of the preferred embodiments of the present invention, there is provided an optical scanning lens characterized in that, regarding a deflected light flux which is deflected by a deflection angle θ at which the light flux enters an effective main scanning region, i.e. a region within the effective main scanning width, if the lateral magnification of the optical scanning lens in the direction corresponding to the sub-scanning direction for the line image formed so that it extends in the direction corresponding to the main scanning direction near the deflective reflecting surface is denoted as β(0), and if the lateral magnification on the optical axis is denoted as β(0), then β(θ) satisfies the following condition:

$$0.95|\beta(0)| \leq |\beta(\theta)| \leq 1.05|\beta(0)| \qquad (2)$$

This means that, when a light flux is deflected at the deflection angle, the line image formed at the image formation point by the optical scanning lens in the direction corresponding to the sub-scanning direction is magnified by β(θ) in the direction corresponding to the sub-scanning direction.

The operation of the optical scanning lens causes the deflected light flux to form an image near the surface to be scanned. In this image formation, the line image formed near the deflective reflecting surface provides the object point in the direction corresponding to the sub-scanning direction. Since the image forming position of the deflected light flux is very close to the surface to be scanned, a relationship "$\omega_B = |\beta(\theta)| \times \omega_A$" provides a good approximation for the light spot formed by the light flux deflected at the deflection angle, wherein the diameter of the line image in the direction corresponding to the sub-scanning direction is denoted as $\omega_A$ and the diameter of the light spot in the sub-scanning direction is denoted as $\omega_B$. Accordingly, when condition (2) is satisfied, it means that the diameter of the light spot in the sub-scanning direction varies in a range of 0.95 to 1.05 (a range of ±5%), taking the reference value of the diameter of the light spot on the optical axis (the light spot that has a zero image height) in the sub-scanning direction as 1. Hence, under this condition which enables successful correction of the curvature of field in the sub-scanning direction, the changes in the light spot caused by image height due to the changes in the image forming magnification can be successfully controlled.

According to another aspect of the preferred embodiments of the present invention, there is provided an optical scanning lens characterized in that the curvature of every surface in the deflective orthogonal surface changes depending on the distance from the optical axis in the main scanning direction. The line passing through the centers of the curvatures in the deflective orthogonal surface is not straight but is curved. The foregoing β(θ) satisfies the foregoing condition (2).

Thus, it becomes easier to satisfy condition (2) by the change in the curvature in the deflective orthogonal surface in both lens surfaces, the changes taking place according to the distance from the optical axis in the direction corresponding to the main scanning direction, although the constant velocity characteristics or the insensitivity of the optical scanning lens to the shift in the direction of the optical axis of the curvature of field in the main scanning direction is slightly sacrificed.

According to still another aspect of the preferred embodiments of the present invention, there is provided an optical scanning lens wherein the curvature in the deflective orthogonal surface changes with the distance from the optical axis in the direction corresponding to the main scanning direction, and in at least one of the surfaces, where the line passing through the centers of the curvatures in the deflective orthogonal surface is not straight but curved, the changes in the radius of curvature in the deflective orthogonal surface in the direction corresponding to the main scanning direction are asymmetrical to the optical axis.

The use of a polygon mirror as the optical deflector poses a problem of the "sag" in which the positional relationship between the line image and the deflective reflecting surface changes as the polygon mirror rotates because the rotational center of the polygon mirror is not located at the deflective reflecting surface. "Sag" occurs asymmetrically with respect to the optical axis of the optical scanning lens. For this reason, if the lens is shaped symmetrically relative to the optical axis, then the constant velocity characteristics or the curvature of field deteriorates. The adverse influences of sag can be effectively reduced by shaping the lens asymmetrically as in the case of this optical scanning lens.

According to a further aspect of the preferred embodiments of the present invention, there is provided an optical scanning lens characterized in that, if the effective main scanning width is denoted as W, the thickness along the optical axis is denoted as d1, and the distance along the optical axis from the starting point of the deflection given by the optical deflector to the surface to be scanned is denoted by L, then these features W, d1, and L satisfy the two conditions shown below;

$$W/L > 0.9 \quad (3)$$

$$10 < (W/L)^2 \cdot (L/d_1) < 30 \quad (4)$$

and the shape of the lens in the deflective surface is preferably made to be biconvex in the main scanning direction.

In this case, if the focal length in the deflective surface is denoted as fm, and the paraxial radius of curvature in the deflective surface of the surface on the side of the deflective reflecting surface is denoted as $R_1$, then they satisfy the following condition:

$$1.0 \leq R_1/fm \leq 3.0 \quad (5)$$

The phrase "effective main scanning width" means the width of a region established as a region in which optical writing is successfully performed, which region is a portion of the scanning region subjected to main scanning performed through the light spot. It is generally established as a design condition of an optical scanning apparatus.

The phrase "starting point of deflection" refers to the position where the deflected light flux is reflected at a zero deflection angle.

In condition (3), (W/L) denotes a ratio of the effective main scanning width W relative to the length L of the optical path from the optical deflector to the surface to be scanned when the image height is zero. As the ratio increases, the optical scanning apparatus becomes more compact and provides a wider field angle. Hence, if the lower limit value, namely, 0.9, of condition (3) is exceeded, then it is difficult to achieve a more compact design or a wider effective main scanning region of the optical scanning apparatus.

In order to achieve a compact optical scanning apparatus by using an optical scanning lens with a minimized difference in thickness, it is desirable that the product of the ratio of the length L of the optical path to the thickness $d_1$ (L/$d_1$) and the square of (W/L), which is the parameter of condition (3), is set to a value within a certain desirable range.

When the product of the parameter $(W/L)^2 \cdot (L/d_1)$ in condition (4) decreases within the range wherein condition (3) is satisfied, the lens thickness d1 increases, and the difference in thickness between a paraxial portion and a peripheral portion inevitably increases, leading to a shape which is disadvantageous for plastics molding. If the lower limit value, namely, 10, of condition (4) is exceeded, the aforesaid disadvantage becomes marked, making it difficult to prevent the occurrence of shaping errors such as sink marks and swelling at the time of fabrication of the optical scanning lens.

As the parameter of condition (4) increases, the thickness of the lens decreases and the optical scanning lens becomes thinner, which is advantageous for fabrication. However, the thinner lens makes it disadvantageous for achieving successful correction of the curvature of field or good constant velocity function.

If the upper limit value, namely, 30, of condition (4) is exceeded, then it becomes difficult to achieve successful correction of the curvature of field in the main scanning direction or a desired constant scanning velocity function.

Further, if the parameter $R_1$/fm in condition (5) exceeds the upper value, namely, 3.0, then it becomes difficult to adjust distortive aberration and to obtain the desired constant scanning velocity function for attaining optical scanning at constant velocity, thus preventing constant scanning velocity characteristics from being maintained. If the parameter in condition (5) exceeds the lower limit value, namely, 1.0, then the thickness of the optical scanning lens tends to increase or the difference in thickness between a paraxial portion and a peripheral portion tends to increase, frequently causing the aforesaid sink marks or swelling mentioned above. Furthermore, the incident angle of the deflected light flux entering the lens surface on the side of the optical deflector grows larger in the peripheral portion in the direction corresponding to the main scanning direction, frequently causing deteriorated performance due to shaping errors or changes in shape caused by environmental changes since plastic lenses are apt to deform under the influences of temperature and/or humidity.

In accordance with another aspect of the preferred embodiments of the present invention, a natural condensing point Q is a point where the light flux coupled by a coupling lens is naturally condensed if there is no line image forming optical system or scanning image forming lens on a virtual optical path developed by extending an optical path along an optical axis from a light source to a surface which is to be scanned. A distance from the starting point of deflection provided by the deflective reflecting surface of the light deflector to the natural condensing point Q is denoted as S. W is a scanning width as referred to above. If the light flux is parallel light, S is exceedingly long (∞), if light is condensing light S is much smaller and in case of divergent type light beam, S is larger than that of the condensing light and smaller than that of parallel light. According to this aspect of the preferred embodiments of the present invention, a ratio of |S/W| is selected such that |S/W|>3. Thus, for parallel light |S/W|=infinity; for condensed light |S/W|=1 and for divergent light |S/W|=6–7. Recognizing the relationship between S and W and determining an optimum value of |S/W| overcomes the conventional problems with each of reflecting surfaces of the polymer mirror being located at different distances from a center point or point rotation of the mirror which causes changing lengths of scanning pulses on scanning surface when non-parallel light is involved. Thus, this eliminates the problems with "sag" as described above.

According to a further aspect of the preferred embodiment of the present invention, it is preferred that the shape of the scanning lens in the deflective surface is made to be biconvex in the main scanning direction. By making the scanning lens biconvex, it is much easier to form scanning lens with varied sections having the non-arc profiles shown in FIGS. 1B and 1C in contrast to forming the scanning lens to be meniscus which is much harder to manufacture and check the quality of lens.

These and other features, advantages and elements of the present invention will be apparent from the following detailed description of the preferred embodiments with reference to the accompanying drawings as described below.

DETAILED DESCRIPTION OF PREFERRED EMBODIMENTS

Specific preferred embodiments of the present invention will now be described.

Figure 1A:
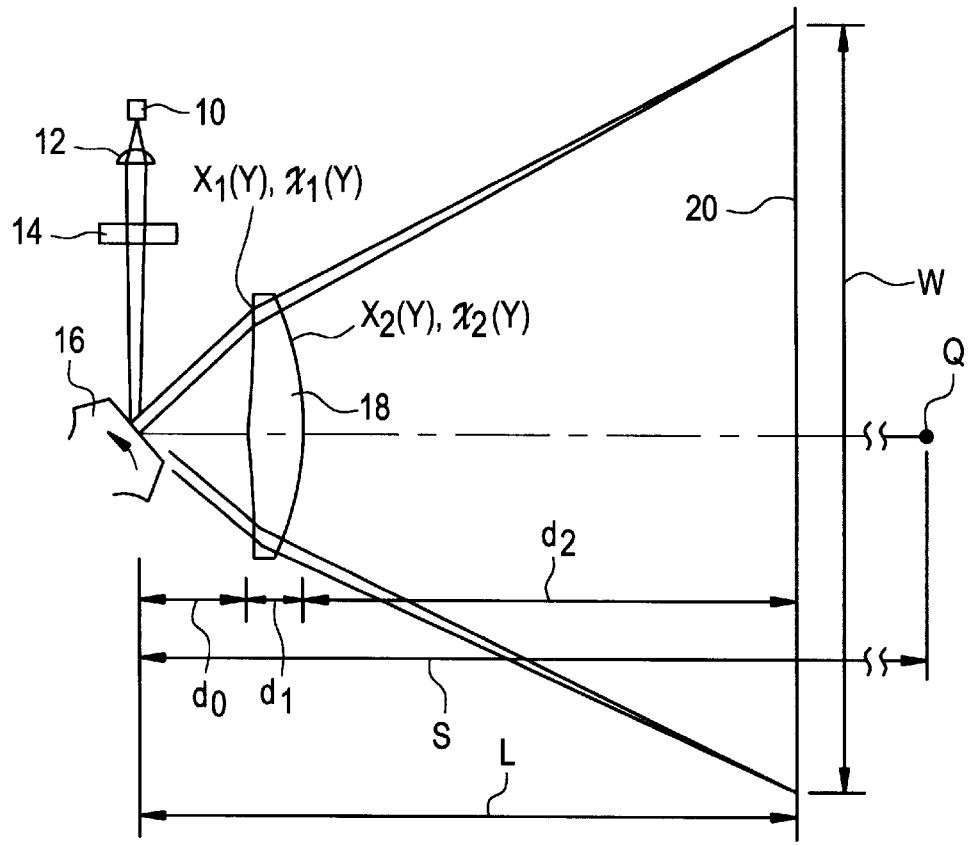
FIG. 1A illustrates a preferred embodiment of an optical scanning lens and an optical scanning apparatus in accordance with one aspect of the present invention.

In FIG. 1A which shows a preferred embodiment of an optical scanning apparatus in accordance with the present invention, a divergent light flux emitted from a light source 10 is coupled to a subsequent optical system through a coupling lens 12. The coupling lens 12 and the light source 10 define a light source unit.

The light flux from the light source 10 is converged in a direction corresponding to the sub-scanning direction, i.e. in the direction orthogonal to the drawing of FIG. 1A, by a cylinder lens 14 to form a line image. The cylinder lens 14 converts the light flux into a line image which extends in the direction corresponding to the main scanning direction. The line image is transmitted to a deflective reflecting surface of a polygon mirror 16 and is then deflected at equiangular velocity as the polygon mirror 16 rotates.

The deflected light flux is transmitted to an optical scanning lens 18 which condenses light flux into the form of a light spot on a surface to be scanned 20 where a photoconductive photosensitive material is disposed. Then the light spot optically scans the surface to be scanned 20 in the main scanning direction, i.e. in the vertical direction in the drawing. Distance W in the drawing denotes the effective main scanning width. The cylinder lens 14 which is the line image forming optical system may be replaced by a concave cylinder mirror.

The coupling lens 12 is an optical element for coupling the light flux from the light source 10 to the optical system from the cylinder lens 14 and components located thereafter. The cylinder lens 14 is capable of transforming the light flux from the light source 10 into a parallel beam, a weak converging beam, or a weak diverging beam.

In the preferred embodiment shown in FIG. 1A, the coupling lens 12 is arranged and adapted to transform the light flux received from the light source 10 into a weak condensing beam. As seen in FIG. 1A, in the direction corresponding to the main scanning direction, the deflected light flux at a zero deflection angle would be condensed at a natural condensing point Q if the optical scanning lens 18 were not present. The natural condensing point is a point where the light flux coupled by the coupling lens 12 is naturally condensed if there is no line image forming optical system or scanning image forming lens on a virtual optical path developed by extending an optical path along an optical axis from a light source to a surface which is to be scanned.

The distance from the starting point of deflection given by the deflective reflecting surface of the light deflector 16 to the natural condensing point Q is denoted as S as shown in the drawing. If the natural condensing point Q is located closer to the surface to be scanned 20 than the optical deflector 16, then S>0. In such a case, the coupled light flux has weak convergence. Conversely, if the natural condensing point Q is located closer to the light source than the optical deflector, then S<0. In this case, the coupled light flux has weak divergence. If the coupled light flux is a parallel beam, then S=∞.

In FIG. 1A, $X_1(Y)$ represents the shape of the lens surface on the side of the optical deflector in the deflective surface, i.e. the shape shown in FIG. 1A; $X_2(Y)$ represents the shape of the lens surface on the side of the surface which is to be scanned, in the deflective surface. These lens surfaces both have non-arc shapes, and they are specified by applying R, K, A, B, C, D and so on in the foregoing formula (1A).

Further, the optical scanning lens 18 is arranged and adapted to establish an approximately conjugate relationship in a geometric-optic manner between the image forming position of the line image and the surface to be scanned 20 in relation to the direction corresponding to the sub-scanning direction, i.e. "surface tilt correcting function". The optical scanning lens 18 has a shape that permits successful correction of the curvature of field in the sub-scanning direction. For this reason, the first and/or second lens surface from the optical deflector has the special toric surface shown in FIG. 1B or 1C. The shapes of the respective surfaces of an optical scanning lens 1 related to the direction corresponding to the sub-scanning direction, i.e. in the direction orthogonal to the drawing in FIG. 1A, are represented by symbols $X_1(Y)$ and $X_2(Y)$, respectively as illustrated in FIG. 1A.

Figure 1B:
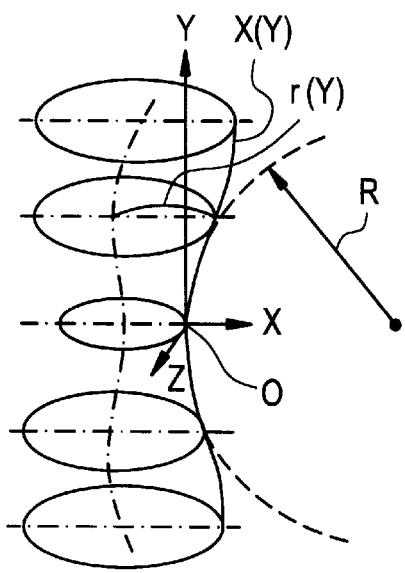
FIG. 1B illustrates a shape of a first surface of the scanning lens shown in FIG. 1A.
Figure 1C:
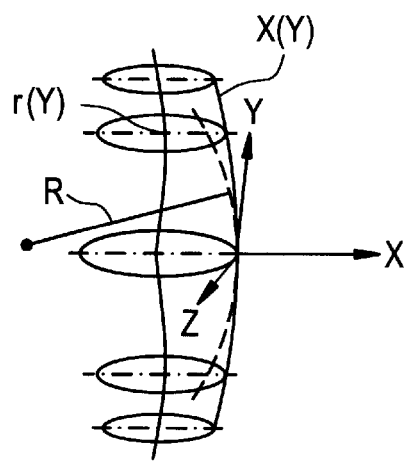
FIG. 1C illustrates the shape of a second surface of the scanning lens shown in FIG. 1A.

Specifically, in FIGS. 1B and 1C, a curve X(Y) indicates a non-arc shape ("R" denotes the paraxial radius of curvature in the foregoing formula). The special toric surfaces are shaped so that the radius of curvature r(Y) of a curvature circle in the deflective orthogonal surface continuously changes according to each Y-coordinate positions of a non-arc shape, i.e. in accordance with the distance from the optical axis in the direction corresponding to the main scanning direction, as shown in FIGS. 1B and 1C. In this case, the line passing through the centers of the curvatures at the radius of curvature r(Y) is generally not straight but curved with many different directions and amounts of curvature as indicated by the chain lines in FIGS. 1B and 1C.

The radius of curvature $r_{s1}(0)$ in the deflective orthogonal surface including the optical axis in the surface on the side of the optical deflector and the radius of curvature $r_{s2}(0)$ in the deflective orthogonal surface including the optical axis in the surface on the side of the surface to be scanned in condition (1) mean r(Y=0) in each surface.

Figure 2:
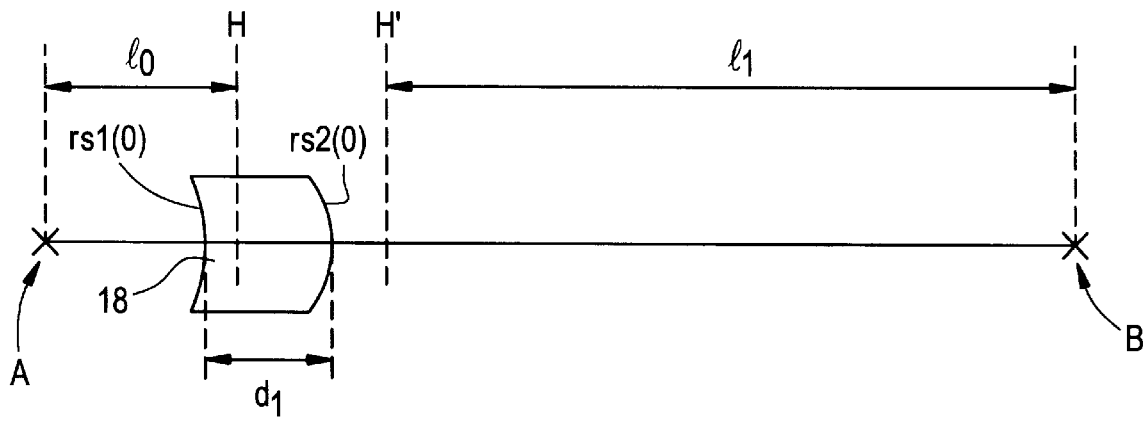
FIG. 2 is a diagram illustrating the shape of the optical scanning lens in a deflective orthogonal surface in accordance with one aspect of the preferred embodiments of the present invention and also illustrating the reduction in magnification.

FIG. 2 shows the shape of the optical scanning lens 18 in the deflective orthogonal surface including the optical axis. As illustrated, the optical scanning lens 18 has a meniscus shape which is concave on the side of the deflective reflecting surface, i.e. on the left in the drawing. As a result, both of the front principal point H and the rear principal point H' related to the function for forming an image in the direction corresponding to the sub-scanning direction are positioned on the side of the surface to be scanned, i.e. on the right in the drawing, away from the scanning lens main body. Consequently, the image forming magnification in the direction corresponding to the sub-scanning direction is as compared with the actual position of the optical scanning lens 18.

Point A in the drawing denotes the position where the line image is formed, and point B is the image formation point where the line image is formed through the optical scanning lens 18. If the distance between point A and the front principal point H is denoted as $1_0$, and the distance between the rear principal point Ht and point B is denoted as $1_1$, then the foregoing $|\beta(0)|$ will be $1_1/1_0$.

Figure 3:
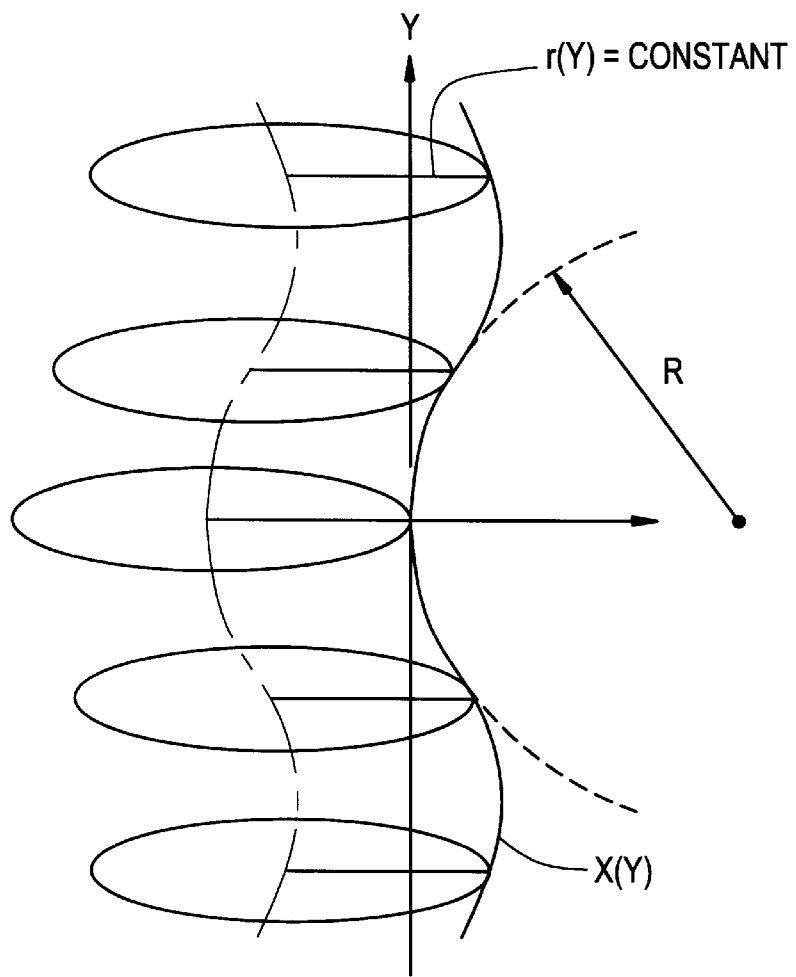
FIG. 3 is a diagram illustrating the surface shapes of the optical scanning lens according to another preferred embodiment of the present invention.

The radius of curvature in the deflective orthogonal surface in one of the surfaces of the optical scanning lens 18 can be set to an approximately fixed value regardless of the distance from the optical axis in the direction corresponding to the main scanning direction. In this case, as illustrated in FIG. 3, the line (indicated by the chain line) penetrating the centers of the curvatures at the radius of curvature r(Y) of the curvature circle in the deflective orthogonal surface in the lens surface is a curve that is approximately identical to the non-arc shape X(Y) in the lens surface as shown in FIG. 3.

Figure 4A:
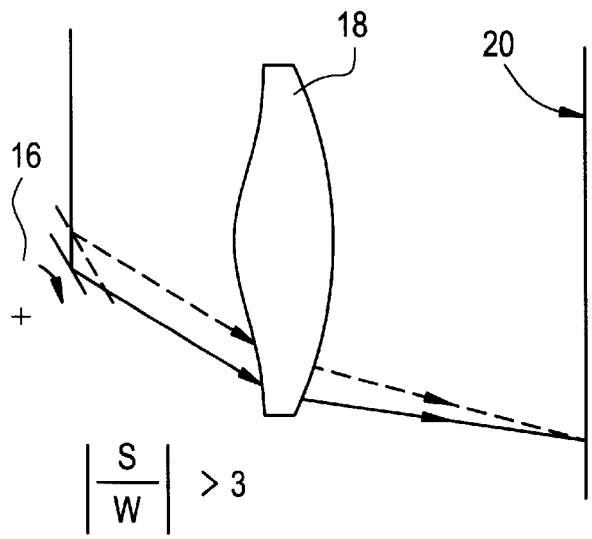
FIG. 4A is a schematic diagram of a scanning operation using a scanning lens according to a preferred embodiment of the present invention.

As seen in FIG. 4A, by arranging the value of $|S/W|$ to be greater than 3, the single scanning lens 18 according to the preferred embodiments of the present invention eliminate sag and provide a constant focusing point on the scanning surface 20 which provides a uniform start point and uniform end point along in a scanning direction on the scanning surface.

Figure 4B:
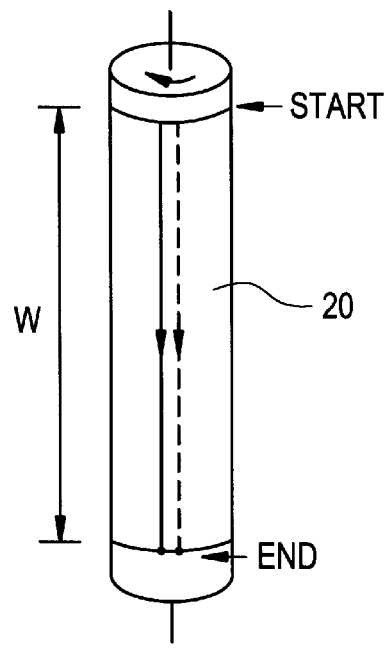
FIG. 4B is a schematic diagram of a scanning operation using a scanning lens according to a conventional device.
Figure 4C:
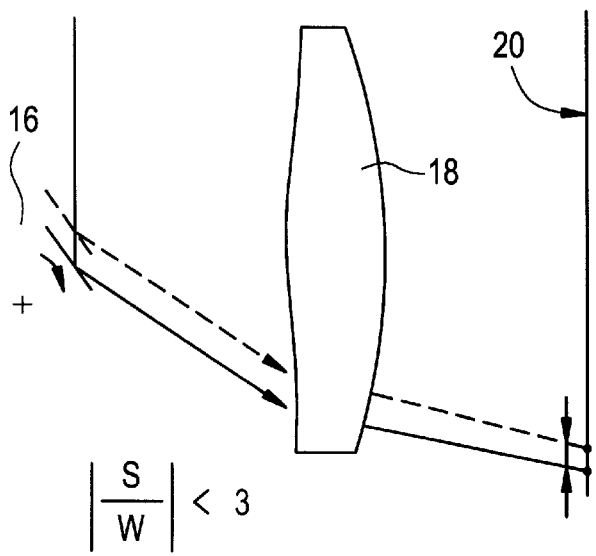
Figure 4D:
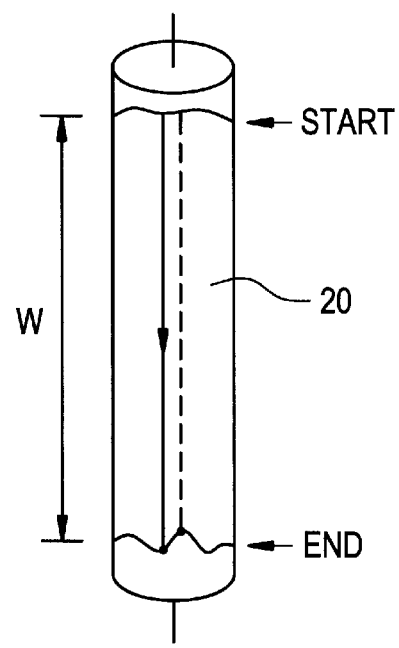
Figure 5A:
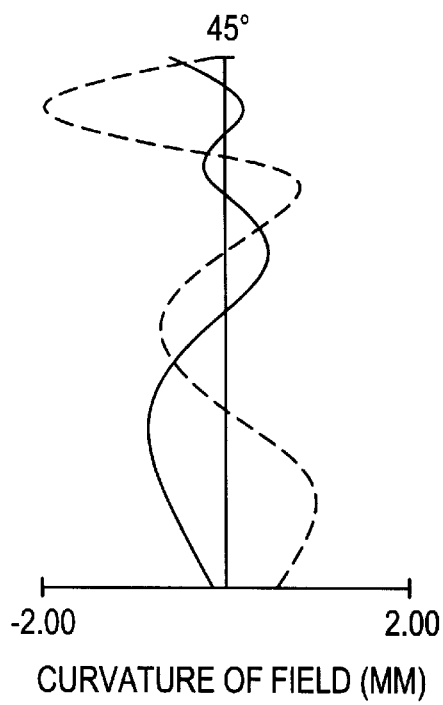
FIG. 5 is a diagram showing the curvature of field and distortive aberration related to a first example of the preferred embodiments of the present invention.
Figure 5B:
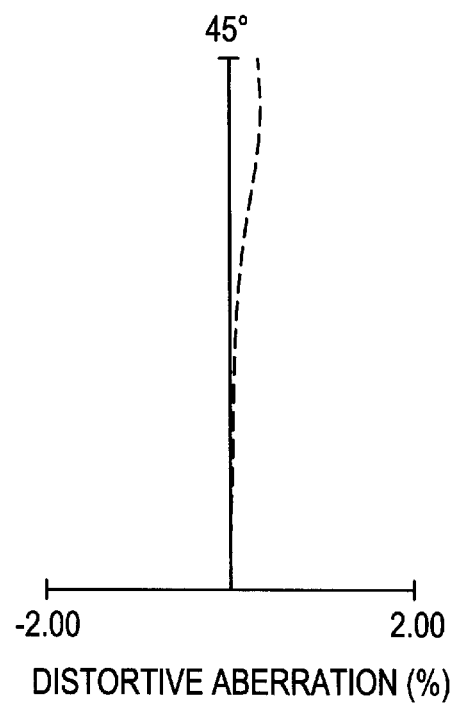
Figure 6A:
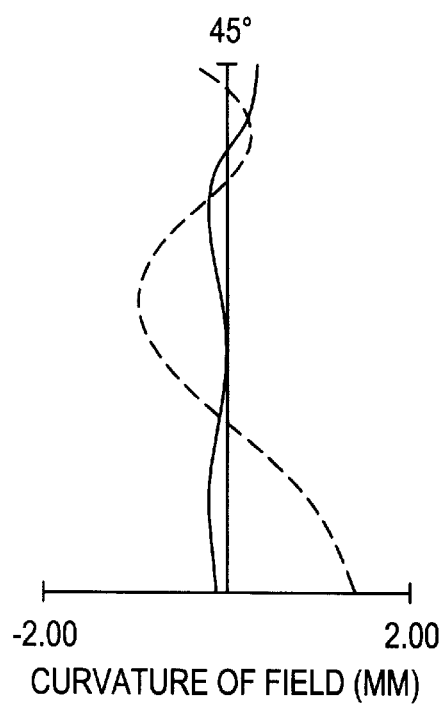
FIG. 6 is a diagram showing the curvature of field and distortive aberration related to a second example of the preferred embodiments of the present invention.
Figure 6B:
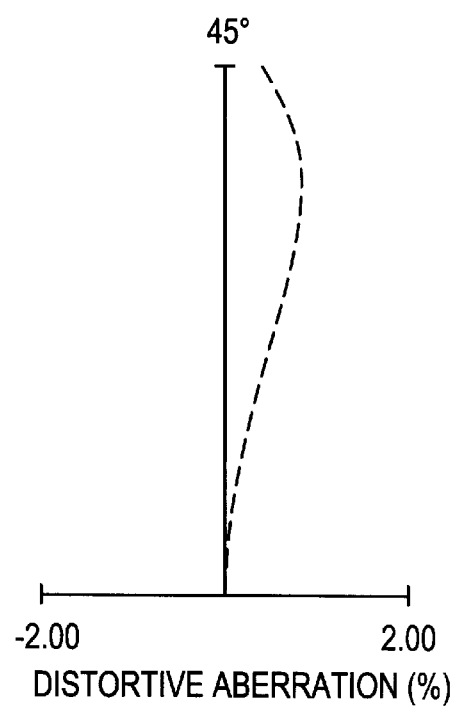
Figure 7A:
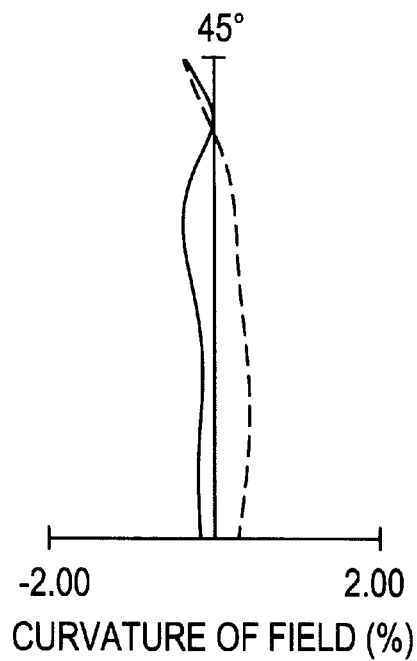
FIG. 7 is a diagram showing the curvature of field and distortive aberration related to a third example of the preferred embodiments of the present invention.
Figure 7B:
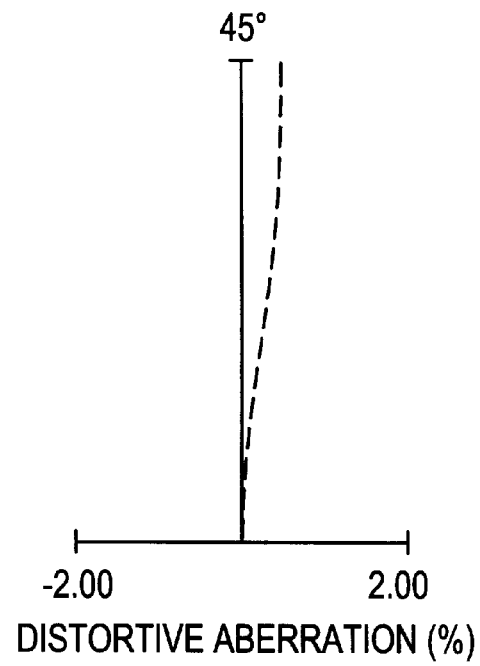
Figure 8A:
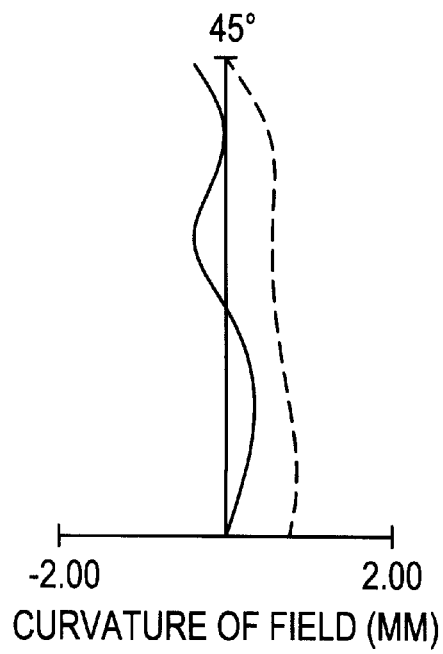
FIG. 8 is a diagram showing the curvature of field and distortive aberration related to a fourth example of the preferred embodiments of the present invention.
Figure 8B:
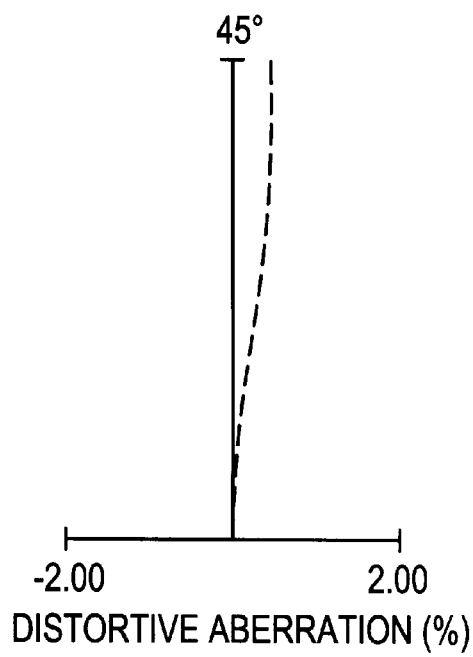
Figure 9A:
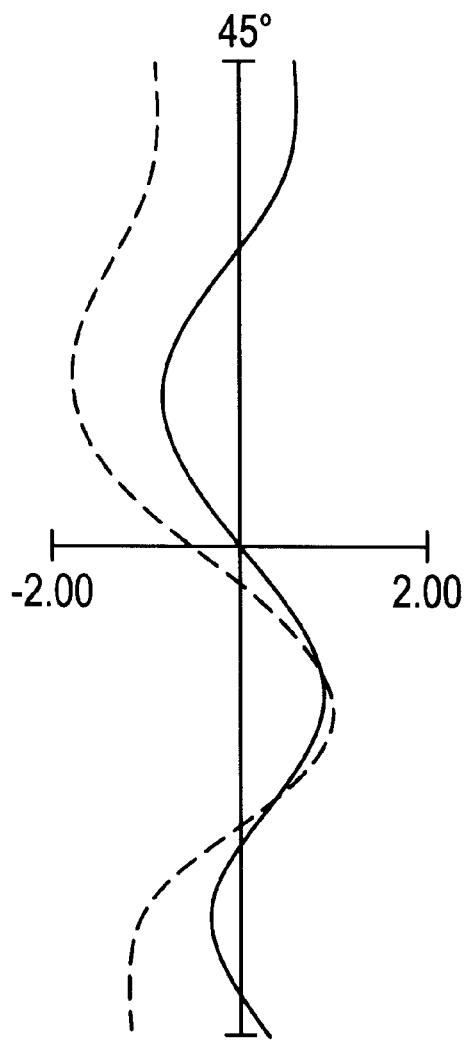
FIG. 9 is a diagram showing the curvature of field and distortive aberration related to a fifth example of the preferred embodiments of the present invention.
Figure 9B:
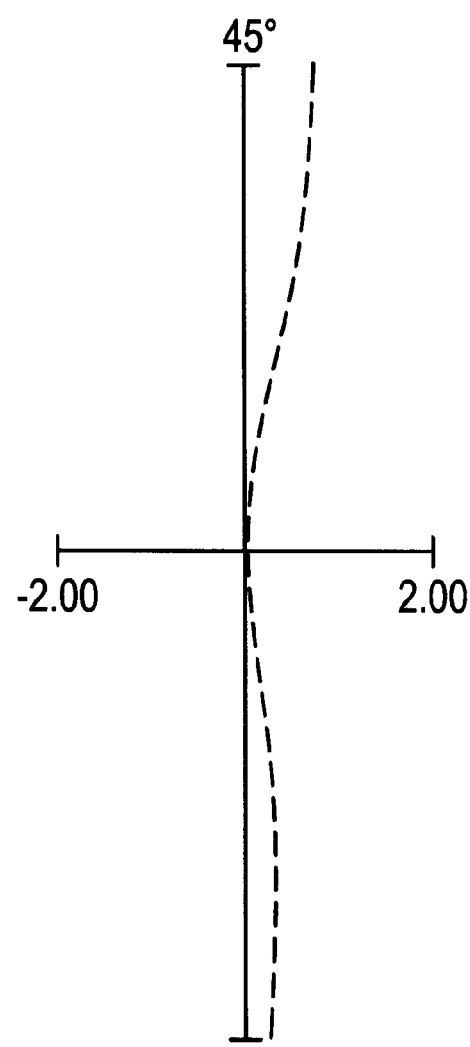
Figure 10A:
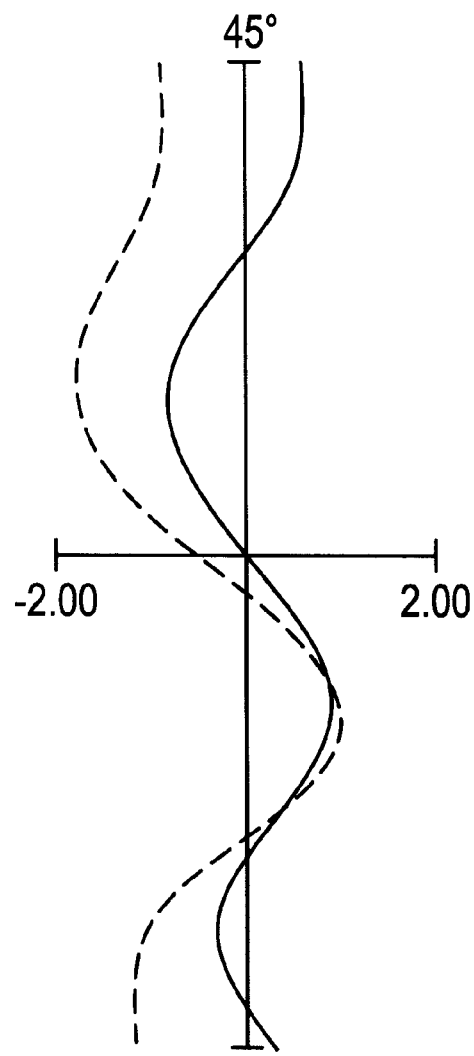
FIG. 10 is a diagram showing the curvature of field and distortive aberration related to a sixth example of the preferred embodiments of the present invention.
Figure 10B:
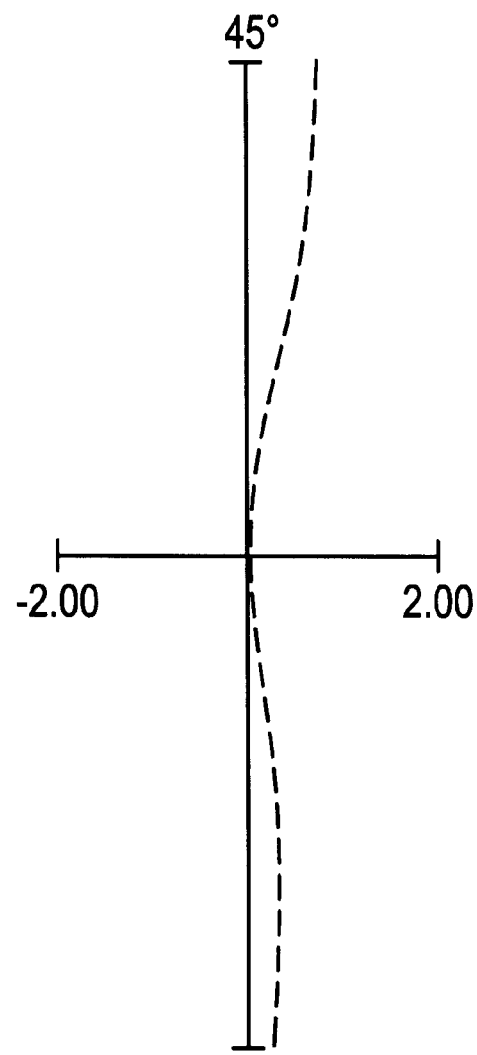

In contrast, as seen in FIG. 4B, the conventional scanning lens, which does not recognize the relationship or importance of $|S/W|$, experiences problems with non-uniform start points and end points on the scanning surface 20 during the scanning process which is caused by the dislocation of the focus point relative to the scanning surface 20. This results in uneven spacing at an end of a line of data written during the scanning process.

Other specific examples of the preferred embodiments will now be described with reference to the remaining drawings. The form of the optical scanning apparatus will be as shown in FIG. 1A in these additional examples of the preferred embodiments.

In all of the examples of the preferred embodiments of the present invention, as illustrated in FIG. 1A, the distance from the starting point of the deflection provided by an optical deflector 16 to the incident surface of the optical scanning lens 18 will be denoted as $d_0$, the thickness of the optical scanning lens 18 on the optical axis is denoted as $d_1$, and the distance between the lens surface on the side of the surface to be scanned 20 and the surface to be scanned 20 is denoted as $d_2$. Accordingly, $L=d_0+d_1+d_2$.

In the deflective surface of the scanning lens 18, the paraxial radii of curvatures of the lens surfaces on the side of the optical deflector and on the side of the surface to be scanned will be denoted as $R_1$ and $R_2$, respectively, and the refractive index of a lens material (related to a wavelength of 780 nm) will be denoted as N. The focal length in the deflective surface will be denoted as fm.

The non-arc shape $X_1(Y)$ in the first lens surface counted from the side of the optical deflector 16, i.e. the surface on the side of the deflective reflecting surface, will be specified by applying $R_1$, $K_1$, $A_1$, $B_1$, $C_1$, and $D_1$; and the non-arc shape $X_2(Y)$ in the second lens surface counted from the side of the optical deflector 16, i.e. the surface on the side of the surface to be scanned 20, will be specified by applying $R_2$, $K_2$, $A_2$, $B_2$, $C_2$, and $D_2$.

Shape $x_1(Y)$ in the surface on the side of the deflective reflecting surface will be given a radius of curvature $r_{s1}(Y)$ in the deflective orthogonal surface wherein distance Y from the optical axis in the direction corresponding to the main scanning direction is a variable. Shape $x_2(Y)$ in the surface on the side of the surface to be scanned will be given a radius of curvature $r_{s2}(Y)$ in the deflective orthogonal surface wherein distance Y from the optical axis in the direction corresponding to the main scanning direction is a variable.

If the radii of curvature $r_{s1}(Y)$ and $r_{s2}(Y)$ are symmetrical with respect to the optical axis, will be expressed by a polynomial of an even-numbered degree shown below:

$$r_{sk}(Y)=r_{sk}(0)+\Sigma a_{kj}\cdot Y^{**}2j$$

wherein, regarding "i," k=1 for the surface on the side of the deflective reflecting surface, and k=2 for the surface on the side of the surface to be scanned; j indicates natural numbers 1, 2, 3 and so on; and $Y^{**}2j$ represents Y raised to the 2j-th power.

These radii of curvature $r_{s1}(Y)$ and $r_{s2}(Y)$, if they are asymmetrical with respect to the optical axis, will be expressed by a polynomial shown below:

$$r_{sk}(Y)=r_{sk}(0)+\Sigma b_{kj}\cdot Y^{**}j \ (j=1, 2, 3 \ldots)$$

The unit of a numerical value having length dimension will be "mm." Further, "E and the values following E" in a numerical value will represent the power of 10; e.g. "E-9" means $10^{-9}$, the numerical value being applied to the one immediately preceding it.

First through fourth examples of the preferred embodiments preferably use, as the optical deflector, a rotary single-surface mirror free from sags, i.e. an optical deflector wherein the center of rotation of the deflective reflecting surface thereof is located at the deflective reflecting surface. The light flux from a light source 10 will be formed into a line image, which extends in the direction corresponding to the main scanning direction, at the position which is the starting point of the deflection given by the deflective reflecting surface through a cylinder lens 14 or the like.

In the first and second preferred examples of the preferred embodiments set forth below, the light flux coupled through a coupling lens 14 is preferably a parallel beam.

| First Example: | | | |
|---|---|---|---|
| $S = \infty$, fm =137.503, W = 216 | | | |
| i | $R_i$ | $d_i$ | N |
| 0 | | 29.887 | |
| 1 | 137.503 | 12.364 | 1.53664 |
| 2 | −154.248 | 132.649 | |

$X_1(Y)$:
$R_1 = 137.503$, $K_1 = -92.438$,
$A_1 = -1.11822E-6$, $B_1 = 7.28745E-10$,
$C_1 = -3.20311E-13$, $D_1 = 9.55204E-17$
$X_2(Y)$:
$R_2 = -154.248$, $K_2 = 5.36873$,
$A_2 = -2.51300E-6$, $B_2 = 1.95625E-9$,
$C_2 = -1.18490E-12$, $D_2 = 3.38372E-16$
$x_1(Y)$: $r_{s1}(Y) = r_{s1}(0) + \Sigma a_{1j} \cdot Y^{**2j}$
$r_{s1}(0) = -35$,
$a_{11} = 2.78772E-2$, $a_{12} = -1.11838E-4$,
$a_{13} = 1.24795E-7$, $a_{14} = -2.06364E-11$,
$a_{15} = -6.94829E-14$, $a_{16} = 3.9456E-17$
$x_2(Y)$: $r_{s2}(Y) = r_{s2}(0) + \Sigma a_{2j} \cdot Y^{**2j}$
$r_{s2}(0) = -12.61$,
$a_{21} = a_{22} = a_{23} = a_{24} = a_{25} = a_{26} = 0.0$
Thus, $r_{s2}(Y)$ takes a fixed value (−12.61) irrespective of Y.

The values in conditions (1), (3), (4), and (5) are as follows:

$\{r_{s2}(0)/r_{s1}(0)\} \times (W/L)^2 = 0.55$, $(W/L) = 1.23$, $(W/L)2 \cdot (L/d_1) = 21.6$, $R_1/fm = 1.0$ Further, $|\beta(\theta)|$, $|\beta(\theta)/\beta(0)|$ in condition (2) will be as shown below when =0, 10, 20, 30, 36, 40, and 45 degrees:

| θ (degrees) | 0 | 10 | 20 | 30 | 36 | 40 | 45 |
|---|---|---|---|---|---|---|---|
| $|\beta(\theta)|$ | 3.19 | 3.16 | 3.13 | 3.12 | 3.10 | 3.11 | 3.10 |
| $|\beta(\theta)/\beta(0)|$ | 1.00 | 0.99 | 0.98 | 0.97 | 0.97 | 0.97 | 0.97 |

| Second Example: | | | |
|---|---|---|---|
| $S = \infty$, fm = 137.047, W = 215 | | | |
| i | $R_i$ | $d_i$ | N |
| 0 | | 34.511 | |
| 1 | 274.094 | 12.045 | 1.57210 |
| 2 | −108.062 | 133.443 | |

$X_1(Y)$:
$R_1 = 274.094$, $K_1 = -0.488153$,
$A_1 = -3.90047E-7$, $B_1 = -3.64736E-11$,

-continued

| Second Example: |
|---|
| $C_1 = 1.52644E-14$, $D_1 = -4.46187E-18$ |
| $X_2(Y)$: |
| $R_2 = -108.062$, $K_2 = 2.98552$, |
| $A_2 = 3.11749E-7$, $B_2 = 2.04686E-11$, |
| $C_2 = -4.65135E-14$, $D_2 = 1.16507E-17$ |
| $x_1(Y)$: $r_{s1}(Y) = r_{s1}(0) + \Sigma a_{ij} \cdot Y^{**2j}$ |
| $r_{s1}(0) = -70$, |
| $a_{11} = 4.92847E-2$, $a_{12} = -1.16452E-4$, |
| $a_{13} = 1.00139E-7$, $a_{14} = -1.64815E-12$, |
| $a_{15} = -5.48422E-14$, $a_{16} = 2.37498E-17$ |
| $x_2(Y)$: $r_{s2}(Y) = r_{s2}(0) + \Sigma a_{2j} \cdot Y^{**2j}$ |
| $r_{s2}(0) = -15.72$, |
| $a_{21} = a_{22} = a_{23} = a_{24} = a_{25} = a_{26} = 0.0$ |
| Thus, $r_{s2}(Y)$ takes a fixed value (−15.72) irrespective of Y. |

The values in conditions (1), (3), (4), and (5) are as follows:

$\{r_{s2}(0)/r_{s1}(0)\} \times (W/L)^2 = 0.32$, $(W/L) = 1.19$, $(W/L)^2 \cdot (L/d_1) = 21.2$, $R_1/fm = 2.0$ Further, $|\beta(\theta)|$, $|\beta(\theta)/\beta(0)|$ in condition (2) will be as shown below when =0, 10, 20, 30, 36, 40, and 45 degrees:

| θ (degrees) | 0 | 10 | 20 | 30 | 36 | 40 | 45 |
|---|---|---|---|---|---|---|---|
| $|\beta(\theta)|$ | 3.01 | 3.01 | 2.99 | 2.94 | 2.92 | 2.91 | 2.88 |
| $|\beta(\theta)/\beta(0)|$ | 1.00 | 1.00 | 0.99 | 0.98 | 0.97 | 0.97 | 0.96 |

In the following third to sixth examples of the preferred embodiments, the light flux coupled through the coupling lens has weak convergence.

| Third Example: | | | |
|---|---|---|---|
| S = 1594.6, fm = 145.17, W = 214 | | | |
| i | $R_i$ | $d_i$ | N |
| 0 | | 33.2 | |
| 1 | 160.0 | 13.5 | 1.5244 |
| 2 | −141.0 | 128.3 | |

$X_1(Y)$:
$R_1 = 160.0$, $K_1 = -59.97$,
$A_1 = -9.465E-7$, $B_1 = 3.85E-10$,
$C_1 = -8.113E-14$, $D_1 = 1.0E-17$
$X_2(Y)$:
$R_2 = -141.0$, $K_2 = 4.69$,
$A_2 = -1.02E-6$, $B_2 = 2.44E-10$,
$C_2 = -7.856E-14$, $D_2 = 2.8E-17$
$x_1(Y)$: $r_{s1}(Y) = r_{s1}(0) + \Sigma a_{ij} \cdot Y^{**2j}$
$r_{s1}(0) = -88.85$,
$a_{11} = a_{12} = a_{13} = a_{14} = a_{15} = a_{16} = 0.0$
Thus, $r_{s1}(Y)$ takes a fixed value (−88.85) irrespectively of Y.
$x_2(Y)$: $r_{s2}(Y) = r_{s2}(0) + \Sigma a_{2j} \cdot Y^{**2j}$
$r_{s2}(0) = -14.94$,
$a_{21} = -2.20767E-3$, $a_{22} = 2.43846E-6$,
$a_{23} = -2.72962E-10$, $a_{24} = -1.13767E-12$,
$a_{25} = 1.0764E-15$, $a_{26} = -3.11961E-19$ The values in conditions (1), (3), (4), and (5) are as follows:

$$\{r_{s2}(0)/r_{s1}(0)\} \times (W/L)^2 = 0.25,$$

$$(W/L) = 1.22, \ (W/L)^2 \cdot (L/d_1) = 19.4,$$

$$R_1/fm = 1.1$$

Further, $|\beta(\theta)|$, $|\beta(\theta)/\beta(0)|$ in condition (2) will be as shown below when =0, 10, 20, 30, 36, 40, and 45 degrees:

| θ (degrees) | 0 | 10 | 20 | 30 | 36 | 40 | 45 |
|---|---|---|---|---|---|---|---|
| $|\beta(\theta)|$ | 2.98 | 2.95 | 2.93 | 2.90 | 2.88 | 2.86 | 2.84 |
| $|\beta(\theta)/\beta(0)|$ | 1.00 | 1.00 | 0.99 | 0.98 | 0.97 | 0.97 | 0.96 |

Fourth Example:

S = 1594.6, fm = 145.76, W = 215

| i | $R_i$ | $d_i$ | N |
|---|---|---|---|
| 0 |  | 33.2 |  |
| 1 | 160.3 | 13.5 | 1.51933 |
| 2 | −139.3 | 128.3 |  |

$X_1(Y)$:
$R_1 = 160.3, K_1 = -58.38,$
$A_1 = -9.22923E-7, B_1 = 3.65515E-10,$
$C_1 = -8.34355E-14, D_1 = 1.113E-17$
$X_2(Y)$:
$R_2 = -139.3, K_2 = 4.83,$
$A_2 = -9.71348E-7, B_2 = 2.37E-10,$
$C_2 = -8.06014E-14, D_2 = 2.65E-17$
$x_1(Y): r_{s1}(Y) = r_{s1}(0) + \Sigma a_{1j} \cdot Y^{**}2j$
$r_{s1}(0) = -108.6,$
$a_{11} = 7.803E-2, a_{12} = -3.15051E-4,$
$a_{13} = 8.16834E-7, a_{14} = -1.10138E-9,$
$a_{15} = 7.352E-13, a_{16} = -1.8802E-16$
$x_{s2}(Y): r_{s2}(Y) = r_{s2}(0) + \Sigma a_{2j} \cdot Y^{**}2j$
$r_{s2}(0) = -15.09,$
$a_{21} = -2.00512E-3, a_{22} = 3.17274E-6,$
$a_{23} = -4.04628E-9, a_{24} = 5.72209E-12,$
$a_{25} = -4.22019E-15, a_{26} = 1.24827E-18$ The values in conditions (1), (3), (4), and (5) are as follows:

$$\{r_{s2}(0)/r_{s1}(0)\} \times (W/L)^2 = 0.21,$$

$$(W/L) = 1.23, \ (W/L)^2 \cdot (L/d_1) = 19.6,$$

$$R_1/fm = 1.1$$

Further, $|\beta(\theta)|$, $|\beta(\theta)/\beta(0)|$ in condition (2) will be as shown below when =0, 10, 20, 30, 36, 40, and 45 degrees:

| θ (degrees) | 0 | 10 | 20 | 30 | 36 | 40 | 45 |
|---|---|---|---|---|---|---|---|
| $|\beta(\theta)|$ | 2.98 | 2.98 | 2.96 | 2.91 | 2.89 | 2.86 | 2.82 |
| $|\beta(\theta)/\beta(0)|$ | 1.00 | 1.00 | 0.99 | 0.98 | 0.97 | 0.96 | 0.95 |

The following fifth and sixth examples of the preferred embodiments preferably use, as the optical deflector, a polygon mirror which has six deflective reflecting surfaces and wherein the radii of the inscribed circles of the deflective reflecting surfaces are about 18 mm. The angle formed by the principal ray of the light flux deflected such that it is orthogonal to the surface to be scanned and the principal ray of the light flux incident on the optical deflector is preferably set to about 60 degrees.

A cylinder lens is preferably used for forming a coupled light flux into a line image, which extends in the direction corresponding to the main scanning direction, at the starting point of the deflection given by a deflective reflecting surface, i.e. the reflection position where the principal ray of the deflected light flux is orthogonalized to the surface to be scanned. Regarding the cylinder lens, the radius of curvature of an incident surface in the direction corresponding to the sub-scanning direction is preferably $rc_1 = 13.54$ (cylinder surface), the radius of curvature of an emergent surface in the direction corresponding to the sub-scanning direction is preferably $rc_2 = \infty$ (plane), the thickness at the center is preferably about $dc_1 = 3.0$, and the refractive index of the material at an operating wavelength is preferably about nc=1.51118. The cylinder lens is disposed such that distance dc2 from the emergent surface to the deflective reflecting surface is preferably about 25.0 mm.

Fifth Example:

S = 1473.8, fm = 145.17, W = 214

| i | $R_i$ | $d_i$ | N |
|---|---|---|---|
| 0 |  | 33.2 |  |
| 1 | 160.0 | 13.5 | 1.5244 |
| 2 | −141.0 | 128.3 |  |

$X_1(Y)$:
$R_1 = 160.0, K_1 = -59.97,$
$A_1 = -9.465E-7, B_1 = 3.85E-10,$
$C_1 = -8.113E-14, D_1 = 1.0E-17$
$X_2(Y)$:
$R_2 = -141.0, K_2 = 4.69,$
$A_2 = -1.02E-6, B_2 = 2.44E-10,$
$C_2 = -7.856E-14, D_2 = 2.8E-17$
$x_1(Y): r_{s1}(Y) = r_{s1}(0) + \Sigma a_{1j} \cdot Y^{**}2j$
$r_{s1}(0) = -88.85,$
$a_{11} = a_{12} = a_{13} = a_{14} = a_{15} = a_{16} = 0.0$
Thus, $r_{s1}(Y)$ takes a fixed value (−88.85) irrespectively of Y.
$x_2(Y): r_{s2}(Y) = r_{s2}(0) + \Sigma a_{2j} \cdot Y^{**}2j$
$r_{s2}(0) = -15.1,$
$a_{21} = -1.81E-3, a_{22} = 2.54E-6,$
$a_{23} = -4.27083E-10, a_{24} = -1.1982E-12,$
$a_{25} = 1.0949E-15, a_{26} = -2.849E-19$
The values in conditions (1), (3), (4), and (5) are as shown below:
$\{r_{s2}(0)/r_{s1}(0)\} \times (W/L)^2 = 0.25,$
$(W/L) = 1.22, (W/L)^2 \cdot (L/d_1) = 19.4,$
$R_1/fm = 1.1$
Further, $|\beta(\theta)|$, $|\beta(\theta)/\beta(0)|$ in condition (2) will be as shown below when = −45, −30, −18, −10, 0, 14, 22, 30, and 45 degrees:

| θ (degrees) | −45 | −30 | −18 | −10 |
|---|---|---|---|---|
| $|\beta(\theta)|$ | 2.90 | 2.88 | 2.90 | 2.88 |
| $|\beta(\theta)/\beta(0)|$ | 1.01 | 1.01 | 1.01 | 1.01 |

| θ (degrees) | 0 | 14 | 22 | 30 | 45 |
|---|---|---|---|---|---|
| $|\beta(\theta)|$ | 2.86 | 2.85 | 2.87 | 2.85 | 2.95 |
| $|\beta(\theta)/\beta(0)|$ | 1.00 | 1.00 | 1.0 | 1.0 | 1.03 |

Sixth Example:

S = 1473.8, fm = 145.17, W = 214

| i | $R_i$ | $d_i$ | N |
|---|---|---|---|
| 0 | | 33.2 | |
| 1 | 160.0 | 13.5 | 1.5244 |
| 2 | −141.0 | 128.3 | |

$X_1(Y)$:
$R_1 = 160.0$, $K_1 = -59.97$,
$A_1 = -9.465E-7$, $B_1 = 3.85E-10$,
$C_1 = -8.113E-14$, $D_1 = 1.0E-17$
$X_2(Y)$:
$R_2 = -141.0$, $K_2 = 4.69$,
$A_2 = -1.02E-6$, $B_2 = 2.44E-10$,
$C_2 = -7.856E-14$, $D_2 = 2.8E-17$
$x_1(Y)$: $r_{s1}(Y) = r_{s1}(0) + \Sigma a_{1j} \cdot Y^{**}2j$
$r_{s1}(0) = -88.5$,
$a_{11} = a_{12} = a_{13} = a_{14} = a_{15} = a_{16} = 0.0$
Thus, $r_{s1(Y)}$ takes a fixed value (−88.5) irrespectively of Y.
$x_2(Y)$: $r_{s2}(Y) = r_{s2}(0) + \Sigma b_{2j} \cdot Y^{**}2j$ (j = 1 to 12)
$r_{s2}(0) = -15.15$,
$b_{21} = 0.0$, $b_{22} = -1.6739E-3$,
$b_{23} = -4.29659E-6$, $b_{24} = 2.32748E-6$,
$b_{25} = 8.2713E-9$, $b_{26} = -4.59883E-9$,
$b_{27} = -3.82146E-12$, $b_{28} = 1.17146E-12$,
$b_{29} = 0.0$, $b_{21} = 1.1234E-15$,
$b_{211} = 0.0$, $b_{212} = -2.66782E-19$,
The values in conditions (1), (3), (4), and (5) are as shown below:
$\{r_{s2}(0)/r_{s1}\} \times (W/L)^2 = 0.25$,
$(W/L) = 1.22$, $(W/L)^2 \cdot (L/d_1) = 19.4$,
$R_1/fm = 1.1$
Further, $|\beta(\theta)|$, $|\beta(\theta)/\beta(0)|$ in condition (2) will be as shown below when = −45, −30, −18, −10, 0, 14, 22, 30, and 45 degrees:

| θ (degrees) | −45 | −30 | −18 | −10 |
|---|---|---|---|---|
| $|\beta(\theta)|$ | 2.95 | 2.92 | 2.92 | 2.92 |
| $|\beta(\theta)/\beta(0)|$ | 1.02 | 1.01 | 1.01 | 1.01 |

| θ (degrees) | 0 | 14 | 22 | 30 | 45 |
|---|---|---|---|---|---|
| $|\beta(\theta)|$ | 2.90 | 2.89 | 2.90 | 2.93 | 2.95 |
| $|\beta(\theta)/\beta(0)|$ | 1.00 | 1.00 | 1.00 | 1.01 | 1.02 |

FIG. 4 through FIG. 9 show the curvatures of fields in the main and sub-scanning directions related to the first through sixth examples of the preferred embodiments shown above and the distortive aberrations related to the constant velocity characteristics. In the diagrams illustrative of the curvatures of fields, the dashed lines indicate the curvatures of fields in the main scanning direction, and the solid lines indicate the curvatures of fields in the sub-scanning direction. In all of the examples of the preferred embodiments, the curvatures of fields in the main and sub-scanning directions are maintained within small ranges.

The distortive aberration of the examples is defined by:

$[\{H(\theta)-H_0(\theta)\}/H_0(\theta)] \times 100 [\{H(\theta)-k_0\theta\}/k_0\theta \times 100(\%)$ when the image height of the light spot obtained when the deflection angle is θ is denoted as H(θ); the ideal image height for the deflection angle θ is denoted as $H_0(\theta)$ (=$k_0\theta$, wherein $k_0$ is a constant). If the optical scanning lens is an fθ lens, then the fθ characteristic will be obtained.

Regarding the fifth and sixth examples of the preferred embodiments wherein the optical deflector is a polygon mirror and sags are involved, the curvatures of fields and the distortive aberrations over the whole range of the deflection angle are shown. In these fifth and sixth examples of the preferred embodiments, neither the curvatures of fields nor the distortive aberrations are symmetrical with respect to the optical axis due to the sags. However, the distortive aberrations are good on both sides of the optical axis, so that the desired constant scanning velocity characteristics can be achieved.

Especially in the sixth example of the preferred embodiments, it can be seen that the curvature of field in the sub-scanning direction has been significantly improved as compared to the fifth examples of the preferred embodiment since careful considerations have been given to the influences of sags and the changes in the radius of curvature in the deflective orthogonal surface in the lens surface on the side of the surface to be scanned are asymmetrical with respect to the optical axis.

Thus, according to the preferred embodiments of the present invention, a novel optical scanning lens and optical scanning apparatus are provided.

The optical scanning lens in accordance with the preferred embodiments of the present invention enables an optical scanning apparatus to have a wider effective main scanning width and a compact design, and also achieves successful correction of curvature of field and constant scanning velocity characteristics, and reduced deterioration in performance attributable to the placement errors of the optical system thereof, thus achieving the formation of a good light spot.

Further, the performance of the optical scanning lens in accordance with the preferred embodiments of the present invention is hardly affected by the placement errors occurring along the direction of the optical axis. Also, changes in the diameter of a light spot in the sub-scanning direction caused by image height are effectively reduced. Moreover, the optical scanning apparatus in accordance with the preferred embodiments of the present invention is capable of reducing the influences of sags. In addition, the optical scanning lens composed of a single lens in accordance with the preferred embodiments of the present invention permits effective prevention of shaping errors such as sink marks and swelling at the time of fabrication using plastics, thus enabling shaping accuracy to be improved.

In addition, the optical scanning apparatus according to the preferred embodiments of the present invention is capable of achieving good optical scanning operation by using the optical scanning lens described above, and it provides a wider effective main scanning range and a compact design.

While the invention has been particularly shown and described with reference to preferred embodiments thereof, it will be understood by those skilled in the art that the foregoing and other changes in form and details may be made therein without departing from the spirit and scope of the invention.

We claim:

1. An optical scanning lens in an optical scanning apparatus that deflects a light flux, which is formed into a line image extending in a direction corresponding to a main scanning direction, at equiangular velocity by an optical deflector which has a deflective reflecting surface in the vicinity of a position where said line image is formed, and arranged such that the optical scanning lens condenses the light flux into a light spot on a surface to be scanned so as to optically scan the surface to be scanned at a constant velocity, the optical scanning lens comprising:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if an effective main scanning width is denoted as W, a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \quad (1)$$

$$10 < (W/L)^2 \cdot (L/d_1) < 30; \quad (2)$$

and the radius of curvature in the sub-scanning direction in one of the surfaces is fixed irrespective of the distance from the optical axis in the direction corresponding to the main scanning direction.

2. The optical scanning lens according to claim 1, wherein:

a light flux is deflected at a deflection angle at which the light flux is to be launched into an effective main scanning region, if the lateral magnification of the optical scanning lens in a direction corresponding to a sub-scanning direction for the line image which is formed so that it extends in the direction corresponding to the main scanning direction, in the vicinity of a deflective reflecting surface is denoted as $\beta(\theta)$, and if said lateral magnification on the optical axis is denoted as $\beta(0)$, then said $\beta(\theta)$ satisfies a condition:

$$0.95|\beta(0)| \leq |\beta(\theta)| \leq 1.05|\beta(0)|. \quad (3)$$

3. The optical scanning lens according to claim 1, wherein:

the curvature of every surface in the deflective reflecting surface varies according to the distance from the optical axis in the direction corresponding to the main scanning direction; and the line passing through the centers of the curvatures in the deflective reflecting surface is curved; and a light flux is deflected at the deflection angle at which the light flux is to be launched into an effective main scanning region, if the lateral magnification of the optical scanning lens in a direction corresponding to a sub-scanning direction for the line image which is formed so that it extends in the direction corresponding to the main scanning direction, in the vicinity of a deflective reflecting surface is denoted as $\beta(\theta)$, and if said lateral magnification on the optical axis is denoted as $\beta(0)$, then said $\beta(\theta)$ satisfies a condition:

$$0.95|\beta(0)| \leq |\beta(\theta)| \leq 1.05|\beta(0)|. \quad (4)$$

4. The optical scanning lens according to claim 1, wherein:

the curvature in the deflective reflecting surface varies in accordance with the distance from the optical axis in the direction corresponding to the main scanning direction, and in at least one of the surfaces, where the line passing through the centers of the curvatures in the deflective reflecting surface is curved, the variations in the radius of curvature in the deflective reflecting surface in the direction corresponding to the main scanning direction are asymmetrical with respect to the optical axis.

5. The optical scanning lens according to claim 1, wherein:

if the focal length in the deflective surface is denoted as fm, and the paraxial radius of curvature in the reflecting surface of the surface on the side of the deflective reflecting surface is denoted as $R_1$, then $R_1$ and fm satisfy a condition:

$$1.0 \leq R_1/fm \leq 3.0. \quad (5)$$

6. An optical scanning lens in an optical scanning apparatus that deflects a light flux, which is formed into a line image extending in a direction corresponding to a main scanning direction, at equiangular velocity by an optical deflector which has a deflective reflecting surface in the vicinity of a position where said line image is formed, and arranged such that the optical scanning lens condenses the light flux into a light spot on a surface to be scanned so as to optically scan the surface to be scanned at a constant velocity, the optical scanning lens comprising:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if a radius of curvature in the deflective reflecting surface including the optical axis in a surface of the single lens located closest to the optical deflector is denoted as $r_{s1}(0)$, the radius of curvature in the deflective reflecting surface including the optical axis in a surface of the single lens closest to the surface to be scanned is denoted as $r_{s2}(0)$, an effective main scanning width is denoted as W, and a distance along the optical axis from a starting point of deflection provided by the optical deflector to the surface to be scanned is denoted as L, then $r_{s1}(0)$, $r_{s2}(0)$, W, and L satisfy a condition:

$$0.2 \leq \{r_{s2}(0)/r_{s1}(0)\} \times (W/L)^2 \leq 0.6; \quad (1)$$

if a distance from the starting point of deflection provided by the deflective reflecting surface of the light deflector to the natural condensing point Q is denoted as S, then S and W satisfy a condition:

$$|S/W| > 3; \quad (2)$$

and if a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \quad (3)$$

$$10 < (W/L)^2 \cdot (L/d_1) < 30 \qquad (4)$$

and a shape of the single lens in the deflective orthogonal surface is biconvex in the main scanning direction.

7. An optical scanning apparatus comprising:

a light source for generating a laser beam;

a forming lens for forming a line image which extends in a direction corresponding to a main scanning direction;

a deflector having a deflective reflecting surface for deflecting the laser beam;

a scanning lens arranged and adapted to focus and condense the light flux into a light spot on a scanning surface which is a surface to be scanned so as to optically scan the surface to be scanned at a constant scanning velocity; wherein the scanning lens includes:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if a radius of curvature in the deflective reflecting surface including the optical axis in a surface of the single lens located closest to the optical deflector is denoted as $r_{s1}(0)$, the radius of curvature in the deflective reflecting surface including the optical axis in a surface of the single lens closest to the surface to be scanned is denoted as $r_{s2}(0)$, an effective main scanning width is denoted as W, and a distance along the optical axis from a starting point of deflection provided by the optical deflector to the surface to be scanned is denoted as L, then $r_{s1}(0)$, $r_{s2}(0)$, W, and L satisfy a condition:

$$0.1 \leq \{r_{s2}(0)/r_{s1}(0)\} \times (W/L)^2 \leq 0.6; \qquad (1)$$

if a distance from the starting point of deflection provided by the deflective reflecting surface of the light deflector to the natural condensing point Q is denoted as S, then S and W satisfy a condition:

$$|S/W| > 3; \qquad (2)$$

and if a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \qquad (3)$$

$$10 < (W/L)^2 \cdot (L/d_1) < 30 \qquad (4)$$

and a shape of the single lens in the deflective orthogonal surface is biconvex in the main scanning direction.

8. An optical scanning lens in an optical scanning apparatus that deflects a light flux, which is formed into a line image extending in a direction corresponding to a main scanning direction, at equiangular velocity by an optical deflector which has a deflective reflecting surface in the vicinity of a position where said line image is formed, and arranged such that the optical scanning lens condenses the light flux into a light spot on a surface to be scanned so as to optically scan the surface to be scanned at a constant velocity, the optical scanning lens comprising:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if an effective main scanning width is denoted as W, a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \qquad (1)$$

$$10 < (W/L)^2 \cdot (L/d_1) < 30; \qquad (2)$$

and the curvature in the deflective orthogonal surface varies in accordance with the distance from the optical axis in the direction corresponding to the main scanning direction, and in at least one of the surfaces, where the line passing through the centers of the curvatures in the deflective orthogonal surface is curved, the variations in the radius of curvature in the deflective orthogonal surface in the direction corresponding to the main scanning direction are asymmetrical with respect to the optical axis.

9. The optical scanning lens according to claim 8, wherein the radius of curvature in the sub-scanning direction in one of the surfaces is fixed irrespective of the distance from the optical axis in the direction corresponding to the main scanning direction.

10. The optical scanning lens according to claim 8, wherein a light flux is deflected at a deflection angle at which the light flux is to be launched into an effective main scanning region, if the lateral magnification of the optical scanning lens in a direction corresponding to a sub-scanning direction for the line image which is formed so that it extends in the direction corresponding to the main scanning direction, in the vicinity of a deflective reflecting surface is denoted as $\beta(0)$, and if said lateral magnification on the optical axis is denoted as $\beta(0)$, then said $\beta(0)$ satisfies a condition:

$$0.95|\beta(0)| \leq |\beta(0)| \leq 1.05|\beta(0)|. \qquad (3)$$

11. The optical scanning lens according to claim 8, wherein the curvature of every surface in the deflective orthogonal surface varies according to the distance from the optical axis in the direction corresponding to the main scanning direction; and the line passing through the centers of the curvatures in the deflective orthogonal surface is curved; and a light flux is deflected at the deflection angle at which the light flux is to be launched into an effective main scanning region, if the lateral magnification of the optical scanning lens in a direction corresponding to a sub-scanning direction for the line image which is formed so that it extends in the direction corresponding to the main scanning direction, in the vicinity of a deflective reflecting surface is denoted as β(0), and if said lateral magnification on the optical axis is denoted as β(0) then said β(0) satisfies a condition:

$$0.95|\beta(0)| \leq |\beta(0)| \leq 1.05|\beta(0)|. \tag{4}$$

12. The optical scanning lens according to claim 8, wherein if the focal length in the deflective surface is denoted as fm, and the paraxial radius of curvature in the deflective surface of the surface on the side of the deflective reflecting surface is denoted as $R_1$, then $R_1$ and fm satisfy a condition:

$$1.0 \leq R_1/fm \leq 3.0. \tag{5}$$

13. An image forming apparatus including an optical scanning apparatus that deflects a light flux, which is formed into a line image extending in a direction corresponding to a main scanning direction, at equiangular velocity by an optical deflector which has a deflective reflecting surface in the vicinity of a position where said line image is formed, and arranged such that the optical scanning lens condenses the light flux into a light spot on a surface to be scanned so as to optically scan the surface to be scanned at a constant velocity, the apparatus comprising:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if an effective main scanning width is denoted as W, a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \tag{1}$$

$$10 < (W/L)^2 \cdot (L/d_1) < 30; \tag{2}$$

and the radius of curvature in the sub-scanning direction in one of the surfaces is fixed irrespective of the distance from the optical axis in the direction corresponding to the main scanning direction.

14. An image forming apparatus including an optical scanning apparatus that deflects a light flux, which is formed into a line image extending in a direction corresponding to a main scanning direction, at equiangular velocity by an optical deflector which has a deflective reflecting surface in the vicinity of a position where said line image is formed, and arranged such that the optical scanning lens condenses the light flux into a light spot on a surface to be scanned so as to optically scan the surface to be scanned at a constant velocity, the apparatus comprising:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if a radius of curvature in the deflective orthogonal surface including the optical axis in a surface of the single lens located closest to the optical deflector is denoted as $r_{s1}(0)$, the radius of curvature in the deflective orthogonal surface including the optical axis in a surface of the single lens closest to the surface to be scanned is denoted as $r_{s2}(0)$, an effective main scanning width is denoted as W, and a distance along the optical axis from a starting point of deflection provided by the optical deflector to the surface to be scanned is denoted as L, then $r_{s1}(0)$, $r_{s2}(0)$, W, and L satisfy a condition:

$$0.2 \leq \{r_{s2}(0)/r_{s1}(0)\} \times (W/L)^2 \leq 0.6; \tag{1}$$

if a distance from the starting point of deflection provided by the deflective reflecting surface of the light deflector to the natural condensing point Q is denoted as S, then S and W satisfy a condition:

$$|S/W| > 3; \tag{2}$$

and if a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \tag{3}$$

$$10 < (W/L)^2 \cdot (L/d_1) < 30 \tag{4}$$

and a shape of the single lens in the deflective orthogonal surface is biconvex in the main scanning direction.

15. An image forming apparatus comprising:

a light source for generating a laser beam;

a forming lens for forming a line image which extends in a direction corresponding to a main scanning direction;

a deflector having a reflective surface for deflecting the laser beam;

a scanning lens arranged and adapted to focus and condense the light flux into a light spot on a scanning surface which is a surface to be scanned so as to optically scan the surface to be scanned at a constant scanning velocity; wherein the apparatus includes:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if a radius of curvature in the deflective orthogonal surface including the optical axis in a surface of the single lens located closest to the optical deflector is denoted as $r_{s1}(0)$, the radius of curvature in the deflective orthogonal surface including the optical axis in a surface of the single lens closest to the surface to be scanned is denoted as $r_{s2}(0)$, an effective main scanning width is denoted as W, and a distance along the optical axis from a starting point of deflection provided by the optical deflector to the surface to be scanned is denoted as L, then $r_{s1}(0)$, $r_{s2}(0)$, W, and L satisfy a condition:

$$0.2 \leq \{r_{s2}(0)/r_{s1}(0)\} \times (W/L)^2 \leq 0.6; \qquad (1)$$

if a distance from the starting point of deflection provided by the deflective reflecting surface of the light deflector to the natural condensing point Q is denoted as S, then S and W satisfy a condition:

$$|S/W| > 3; \qquad (2)$$

and if a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \qquad (3)$$

$$10 < (W/L)^2 \cdot (L/d_1) < 30 \qquad (4)$$

and a shape of the single lens in the deflective orthogonal surface is biconvex in the main scanning direction.

16. An image forming apparatus including an optical scanning apparatus that deflects a light flux, which is formed into a line image extending in a direction corresponding to a main scanning direction, at equiangular velocity by an optical deflector which has a deflective reflecting surface in the vicinity of a position where said line image is formed, and arranged such that the optical scanning lens condenses the light flux into a light spot on a surface to be scanned so as to optically scan the surface to be scanned at a constant velocity, the apparatus comprising:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if an effective main scanning width is denoted as W, a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \qquad (1)$$

$$10 < (W/L)^2 \cdot (L/d_1) < 30; \qquad (2)$$

and the curvature in the deflective orthogonal surface varies in accordance with the distance from the optical axis in the direction corresponding to the main scanning direction, and in at least one of the surfaces, where the line passing through the centers of the curvatures in the deflective orthogonal surface is curved, the variations in the radius of curvature in the deflective orthogonal surface in the direction corresponding to the main scanning direction are asymmetrical with respect to the optical axis.

17. An optical scanning apparatus comprising:

a light source for generating a light flux;

a optical deflector having a deflective reflecting surface and arranged to deflect the light flux received from the light source so as to form the light flux into a line image extending in a direction corresponding to a main scanning direction, at equiangular velocity;

an optical scanning lens arranged to condense the light flux received from the optical deflector into a light spot on a surface to be scanned so as to optically scan the surface to be scanned at a constant velocity, wherein the optical scanning lens includes:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if an effective main scanning width is denoted as W, a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \qquad (1)$$

$$10 < (W/L)^2 \cdot (L/d_1) < 30; \qquad (2)$$

and the radius of curvature in the sub-scanning direction in one of the surfaces is fixed irrespective of the distance from the optical axis in the direction corresponding to the main scanning direction.

18. An optical scanning apparatus comprising:

a light source for generating a light flux;

a optical deflector having a deflective reflecting surface and arranged to deflect the light flux received from the light source so as to form the light flux into a line image extending in a direction corresponding to a main scanning direction, at equiangular velocity;

an optical scanning lens arranged to condense the light flux received from the optical deflector into a light spot on a surface to be scanned so as to optically scan the surface to be scanned at a constant velocity, wherein the optical scanning lens includes:

a single lens having a meniscus shape in a sub-scanning direction, which is concave on a side closest to the deflective reflecting surface;

two surfaces of said single lens having non-arc shapes in a main scanning direction;

a curvature of at least one of said two surfaces in the sub-scanning direction varies according to a distance from an optical axis of the single lens in a direction corresponding to the main scanning direction, and a line passing through centers of curvatures in the sub-scanning direction is curved in the main scanning direction; wherein if an effective main scanning width is denoted as W, a thickness of the lens along the optical axis is denoted as $d_1$, and a distance along the optical axis from a starting point of deflection provided by the optical deflector to the surface to be scanned is denoted by L, then W, $d_1$, and L satisfy:

$$W/L > 0.9 \tag{1}$$

$$10 < (W/L)^2 \cdot (L/d_1) < 30; \tag{2}$$

and the curvature in the deflective orthogonal surface varies in accordance with the distance from the optical axis in the direction corresponding to the main scanning direction, and in at least one of the surfaces, where the line passing through the centers of the curvatures in the deflective orthogonal surface is curved, the variations in the radius of curvature in the deflective orthogonal surface in the direction corresponding to the main scanning direction are asymmetrical with respect to the optical axis.

* * * * *